(12) United States Patent
Eguchi

(10) Patent No.: US 6,861,816 B2
(45) Date of Patent: Mar. 1, 2005

(54) POSITIONAL CONTROL OF A CONTROLLED OBJECT DURING MOVEMENT INITIATION

(75) Inventor: Satoshi Eguchi, Niwa-gun (JP)

(73) Assignee: Okuma Corporation, Niwa-gun (JP)

( * ) Notice: Subject to any disclaimer, the term of this patent is extended or adjusted under 35 U.S.C. 154(b) by 109 days.

(21) Appl. No.: 10/424,063

(22) Filed: Apr. 28, 2003

(65) Prior Publication Data
US 2003/0201746 A1 Oct. 30, 2003

(30) Foreign Application Priority Data
Apr. 30, 2002 (JP) ........................................ 2002-127861

(51) Int. Cl.$^7$ ........................................... G05B 19/404
(52) U.S. Cl. ...................... 318/632; 318/619; 318/621; 318/623
(58) Field of Search ............................. 318/560, 568.22, 318/609, 610, 614, 619, 621, 623, 632, 649

(56) References Cited

U.S. PATENT DOCUMENTS

| | | | | |
|---|---|---|---|---|
| 4,799,981 A | * | 1/1989 | Stone et al. ................... 156/64 |
| 4,890,046 A | * | 12/1989 | Kurakake et al. ............. 318/630 |
| 5,134,354 A | * | 7/1992 | Yamamoto et al. ........... 318/609 |
| 5,374,884 A | * | 12/1994 | Koren et al. ................. 318/632 |
| 5,998,957 A | * | 12/1999 | Tadmor et al. ............. 318/701 |
| 6,744,233 B1 | * | 6/2004 | Tsutsui ........................ 318/560 |

* cited by examiner

Primary Examiner—Bentsu Ro
(74) Attorney, Agent, or Firm—Oliff & Berridge, PLC

(57) ABSTRACT

In a positional control device for controlling a position of a controlled object using a motor, when generating a torque command value τc which serves as the command value for the servo motor of the controlled object system (112), a friction compensation value for use when the controlled object initiates a movement is calculated based on a velocity command value V and a torque command value τc determined according to a positional command value Xo supplied from a superordinate device. More specifically, an initial friction compensation calculating section calculates a torque compensation amount Vsfc1 corresponding to a difference between torque being generated during the standstill state and torque required by the controlled object to initiate the movement, and a torque compensation amount Vsfc2 to an amount of change in friction that occurs during a transition from static friction to kinetic friction in a period immediately before and after initiation of the movement. Vsfc1 and Vsfc2 are then used to calculate compensated values of the torque command value τc. Positional tracking deviation generated due to friction during a movement initiation can thereby be reduced, regardless of operational conditions during the standstill state or of the movement direction and velocity effected thereafter.

18 Claims, 7 Drawing Sheets

POSITIONAL CONTROL OF A CONTROLLED OBJECT DURING MOVEMENT INITIATION

BACKGROUND OF THE INVENTION

1. Field of the Invention

The present invention relates to a positional control device which controls a position of an object in accordance with a command from a superordinate device, and more particularly to control of a controlled object during initiation of movement.

2. Description of the Related Art

FIG. 5 is a block diagram showing one example of a conventional full closed positional control device (hereinafter referred to simply as a positional control device). The positional control device controls the position of an object system 112 comprising a movable member, such as a table, connected via a coupling with a servo motor (not shown) serving as the drive motor for enabling movement. The configuration and operation of the positional control device are explained as follows. The positional control device receives input of a positional command value Xo from a superordinate device (not shown). A velocity adjustment processor 100 executes velocity adjustment processing for reducing the rate of change over time of the positional command value Xo such that tracking of the actual position of the controlled object becomes possible, and outputs the final positional command value X. A subtractor 101 subtracts a detected positional value xL from the positional command value X to calculate a positional deviation X-xL. The detected positional value xL is a positional detection signal obtained by directly detecting the position of the controlled object in the controlled system 112 using a linear scale or the like (not shown).

Meanwhile, the positional command value X is subjected to time differentiation in differentiators 104 and 109, with the resulting outputs being a velocity command value V and an acceleration command value A, respectively. The acceleration command value A is amplified in an amplifier 110 by a rate of acceleration torque conversion constant Ca to produce an acceleration torque command value τca for generating the acceleration in the object system 112. The velocity command value V and the acceleration torque command value τca are added to a velocity command and a torque command, respectively. The above-described processing sequence constitutes the well-known feed forward block of a positional control device, which is provided for reducing the ever extant positional deviation X-xL to zero.

An amplifier 102 performs linear amplification of the positional deviation X-xL at an amplification rate of positional loop gain Gp. The output from the amplifier 102 is added in an adder 103 to the velocity command value V and an initial friction compensation value Vsfc, producing the final velocity command Vc. A subtractor 105 subtracts motor velocity vm from the velocity command value Vc to calculate velocity deviation Vc-vm. The motor velocity vm is a value output from a differentiator 107 which calculates a time derivative of rotational angular position xm of a positional detector (not shown) connected to the servo motor, or, alternatively, is a value output from a velocity detector (not shown) connected to the servo motor. An amplifier 106 amplifies the velocity deviation Vc-vm by an amplification rate of velocity loop gain Gv.

The output from the amplifier 106 is added to the acceleration torque command value τca in an adder 108 to produce a torque command value τc. The torque command value τc is subjected to power amplification in a power amplifying section 111, producing generated torque τ for the object system 112. The power amplifying section 111 comprises a power amplifier and a servo motor, and outputs the generated torque τ by amplifying the torque command value τc. The rate of the amplification is denoted by torque conversion constant Ct. The generated torque τ is supplied to the object system 112 to drive the system. The symbol S in the differentiators of FIG. 5 denotes an operator of a Laplace transform indicating a differentiating operation.

One example operation of an initial friction compensation calculating section of a conventional positional control device is next described. Just before and after an object of control starts moving from a standstill state, namely, during initiation of a movement, friction force can be discontinuous. The initial friction compensation calculating section is provided for performing a compensation in such a situation. An inverse movement initiation detector 113 receives input of the velocity command value V, and outputs a pulse signal Fsf. Fsf is a binary signal indicating either ON or OFF, in which ON is output in a form of a pulse according to (1).

$$\text{Fsf:ON (during movement initiation where } V<0 \Rightarrow V=0 \Rightarrow V>0 \text{ or } V>0 \Rightarrow V=0 \Rightarrow V<0) \quad (1)$$

In other words, Fsf:ON is output in a pulse form during movement initiation only when the movement direction before stopping differs from the movement direction after initiation.

A friction compensation generator 114 receives input of the velocity command value V and Fsf. When Fsf:ON, the friction compensation generator 114 outputs an initial friction compensation value Vsfc in patterns according to equations (2) and (3). In equation (2), sgn(V) denotes a signum, where sgn(V)=+1 when V>0, sgn(V)=−1 when V<0, and sgn(V)=+0 when V=0.

$$Vsfc(0) = sgn(V) \cdot Vsfco \quad (2)$$

Here, Vsfc(0) denotes an initial value of Vsfc. Vsfco denotes a designated initial friction compensation amount preset in the friction compensation generator 114 (designated for Vsfco>0).

$$Vsfc = Vsfc(0) \cdot \exp(-t/Td) \quad (3)$$

Here, t denotes time past after Fsf:ON is output. Td denotes a time constant preset in the friction compensation generator 114. Equation (3) expresses the time characteristic of the initial friction compensation value Vsfc, which is a gradual attenuation characteristic in this example.

FIG. 6 is a block diagram showing an equivalent representation of a configuration of the object system 112 from the point of view of positional movement. A value obtained by subtracting load torque τL from the generated torque τ serves as the acceleration/deceleration torque τma for the servo motor, which determines the rotational angular position xm of the servo motor (Im denotes the moment of inertia of the servo motor). The detected positional value xL indicates the position of the movable member such as a table. Because the servo motor and the movable member are connected by a coupling or the like, the overall rigidity K of the drive system governs the positional relationship between those two components. More specifically, load torque τL can be expressed by rigidity K times positional deviation xm-xL. The load torque τL is combined with disturbance torque τLd adding to the load. Disturbance torque τLd is denoted by a sum of external torque τex adding to the load, such as gravity, and frictional torque τf. The sum of the load torque τL and the disturbance torque τLd represents the acceleration/deceleration torque in the load direction τLa, which determines the detected positional value xL in the load direction (IL denotes the moment of inertia in the load direction).

The positional operation of the object system 112 can be explained as above. However, because of the characteristic of the frictional torque τf, the above explanation using FIG. 6 can be applied only for a case when the load is in motion, during which kinetic friction torque τkf can be used, namely, τf=τkf. For a case when the load is not in motion, use of static friction denoted by τsf, namely, τf=τsf, would result in expressing the required conditions for initiating a movement of the load as shown in equation (4).

$$\left.\begin{array}{c}\tau = \tau L > |\tau f| - \tau ex = -|\tau sf| - \tau ex \\ \text{(condition for generating a movement in direction } P) \\ \tau = \tau L > |\tau f| - \tau ex = -|\tau sf| - \tau ex \\ \text{(condition for generating a movement in direction } N) \end{array}\right\} \quad (4)$$

According to the above, it would be determined that the load remains in a standstill state in the range defined by equation (5).

$$(-|\tau sf| - \tau ex) \leq \tau \leq (|\tau sf| - \tau ex) \quad (5)$$

One example operation of the above-described conventional positional control device shown in FIG. 5 is next explained referring to the timing chart of FIG. 7. In FIG. 7, the first to fourth rows from the top illustrate operations of the respective portions of the positional control device when no initial friction compensation value is added, while the fifth to seventh rows indicate operations of the conventional initial friction compensation calculating section on the same time axis. In this example, it is assumed that τex=0 and |τsf|>|τkf| hold true. Passage of time t is given by the horizontal axis. The top row shows the velocity command value V. The velocity command value V shows that, in this example, two cycles of a movement in direction P (V>0) and a stop are repeated, then two cycles of a movement in direction N (V<0) and a stop are repeated, and finally one additional movement in direction P (V>0) is performed.

The second row illustrates the generated torque τ of the servo motor on the same time axis. The third row shows the disturbance torque τLd in the load direction. As τex=0 holds true in this example, the disturbance torque τLd in the load direction can be expressed by the following equation (6) in accordance with FIG. 6.

$$\left.\begin{array}{c}-\tau Ld = \tau - (\tau La + \tau ma) = -\tau kf \text{ (when the axis is in motion)} \\ -\tau Ld = \tau L = \tau \text{ (when the axis is at a standstill)}\end{array}\right\} \quad (6)$$

It should be noted that, when in a standstill state, the disturbance torque τLd would be undefined according to equation (5).

$$-|\tau sf| \leq -\tau Ld \leq |\tau sf| \quad (7)$$

In FIG. 7, the disturbance torque τLd during a standstill is shown as being fixed at 0<-τLd<|τsf|.

The fourth row indicates the tracking deviation X–xL of the positional control device generated due to the influence of frictional torque during a movement initiation when no initial friction compensation value is added. At times t1 and t4 which are the instances at which a movement in direction P is initiated, tracking delay in direction P(denoted as +) is small because the generated torque τ during a standstill is similar to the condition τ>|τsf| (equation 4) for initiating a P-direction movement. On the other hand, at times t2 and t3 which are the instances at which a movement in direction N is initiated, tracking delay in direction N(denoted as −) is relatively large because the generated torque τ during a standstill is differs completely from the condition τ<−|τsf| (from equation 4) for initiating an N-direction movement. Further, at each of times t1–t4', a second tracking deviation is generated in a direction opposite from the first tracking deviation direction. This second tracking deviation is caused by a difference in magnitude between static friction τsf and kinetic friction τkf. Accordingly, the second tracking deviation increases when the difference between static and kinetic frictions becomes larger.

The pulse signal Fsf, the signum sgn(V), and the initial friction compensation value Vsfc shown in the fifth to seventh rows of FIG. 7 describe the operation of the initial friction compensation calculating section of a conventional positional control device shown in FIG. 5. The pulse signal Fsf is turned ON only when a movement initiation in an inverse direction is executed. Accordingly, the initial friction compensation value Vsfc is generated at times t2 and t4, but not at times t1 and t3. Moreover, at times t2 and t4 when compensation values are generated, compensation is executed at the same absolute value even though the difference between the generated torque during standstill and the torque required by the movement initiation greatly differs between times t2 and t4.

As a result, with the conventional initial friction compensation, there is no improvement in the initial tracking deviation X–xL at times t1 and t3. Further, at times t2 and t4 when compensation operations are performed, setting of the designated initial friction compensation amount Vsfco so as to favorably reduce the tracking deviation at time t2 results in performing excessive compensation at time t4, producing a tracking deviation in an inverse direction. On the contrary, when Vsfco is set such that the tracking deviation at time t4 is favorably reduced, compensation is not sufficiently executed at time t2, failing to effectively reduce the tracking deviation. Moreover, there is no additional reduction in the second tracking deviation generated at each of times t1–t4.

As described above, the initial friction compensation function of a conventional positional control device performs a friction compensation operation in the direction of the initiated movement when the movement directions before and after an axis stop differ, and performs no friction compensation operation when the movement directions before and after an axis stop are the same. Accordingly, it is disadvantageous in that the instances at which the friction compensation operations are performed do not match the instances at which axis movement delays due to static friction actually occur. In addition, even when a friction compensation operation is performed at a proper point, compensation tends to be either excessive or insufficient because the initial friction compensation value is determined without taking into account the generated torque τ value of the servo motor during the standstill state. Another problem is that no measures are taken with respect to the tracking deviation generated due to a difference in magnitude between static friction and kinetic friction. As such, the initial friction compensation function of a conventional positional control device cannot satisfactorily accomplish the original object of initial friction compensation, which is to reduce a movement delay due to friction during a movement initiation, by generating a friction compensation value having appropriate direction and magnitude at an instance when the movement delay occurs, such that positional deviation X–xL at the initiation of movement is minimized.

SUMMARY OF INVENTION

When calculating a torque command value which serves as a command value for a drive motor, a positional control device according to the present invention performs torque compensation corresponding to a difference between torque being generated at a standstill state and torque required by the controlled object to initiate a movement, based on a velocity command value calculated using a supplied positional command value and the torque command value.

Further, when calculating a torque command value which serves as a command value for a drive motor, the positional control device according to the present invention performs torque compensation corresponding to an amount of change in friction during a transition from static friction to kinetic friction in a period just before and after initiation of a movement, in accordance with a velocity command value calculated using a received positional command value and the torque command value.

DESCRIPTION OF PREFERRED EMBODIMENTS

Figure 1:
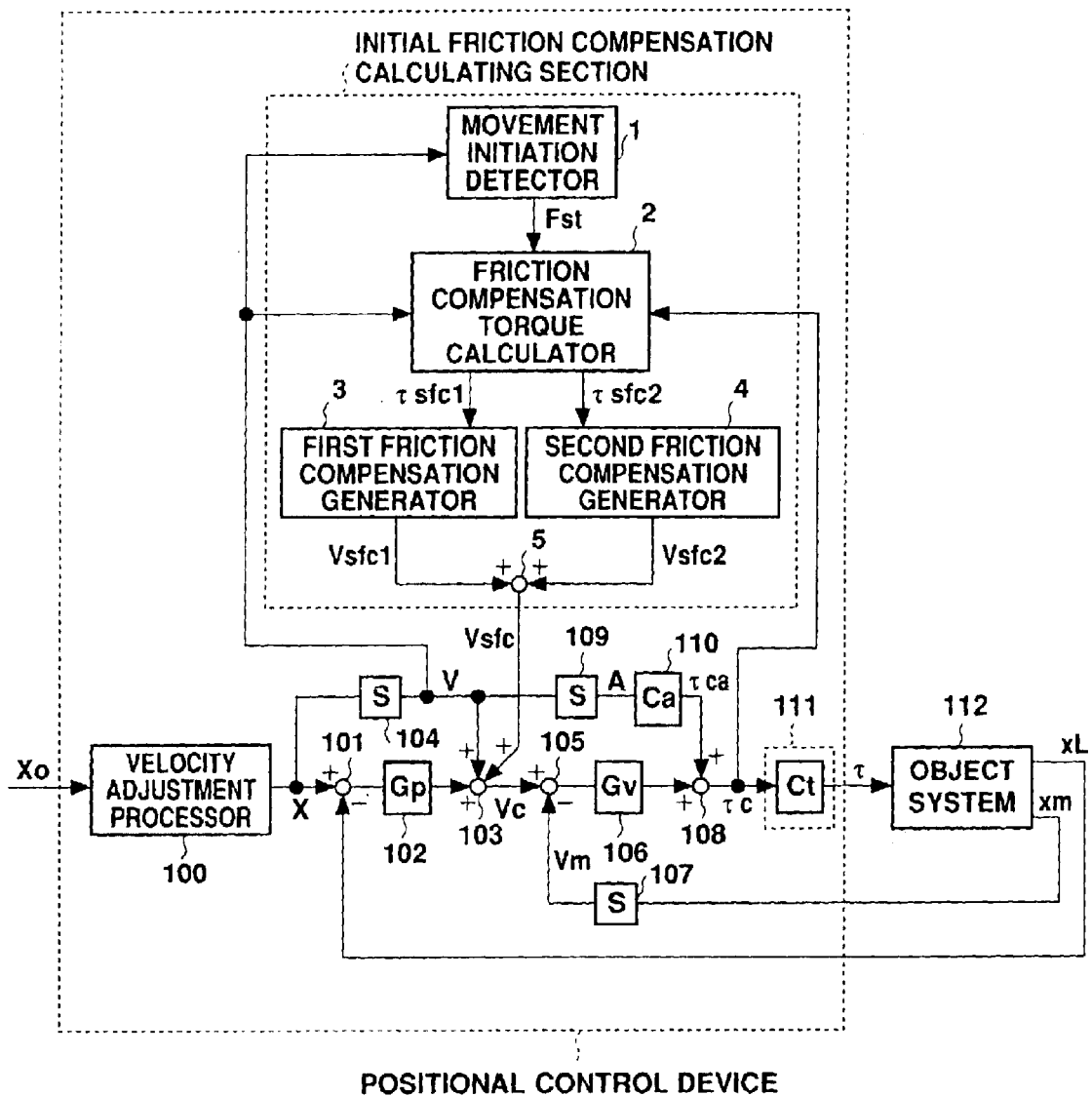
FIG. 1 is a block diagram showing a configuration of a positional control device according to an embodiment of the present invention.
Figure 5:
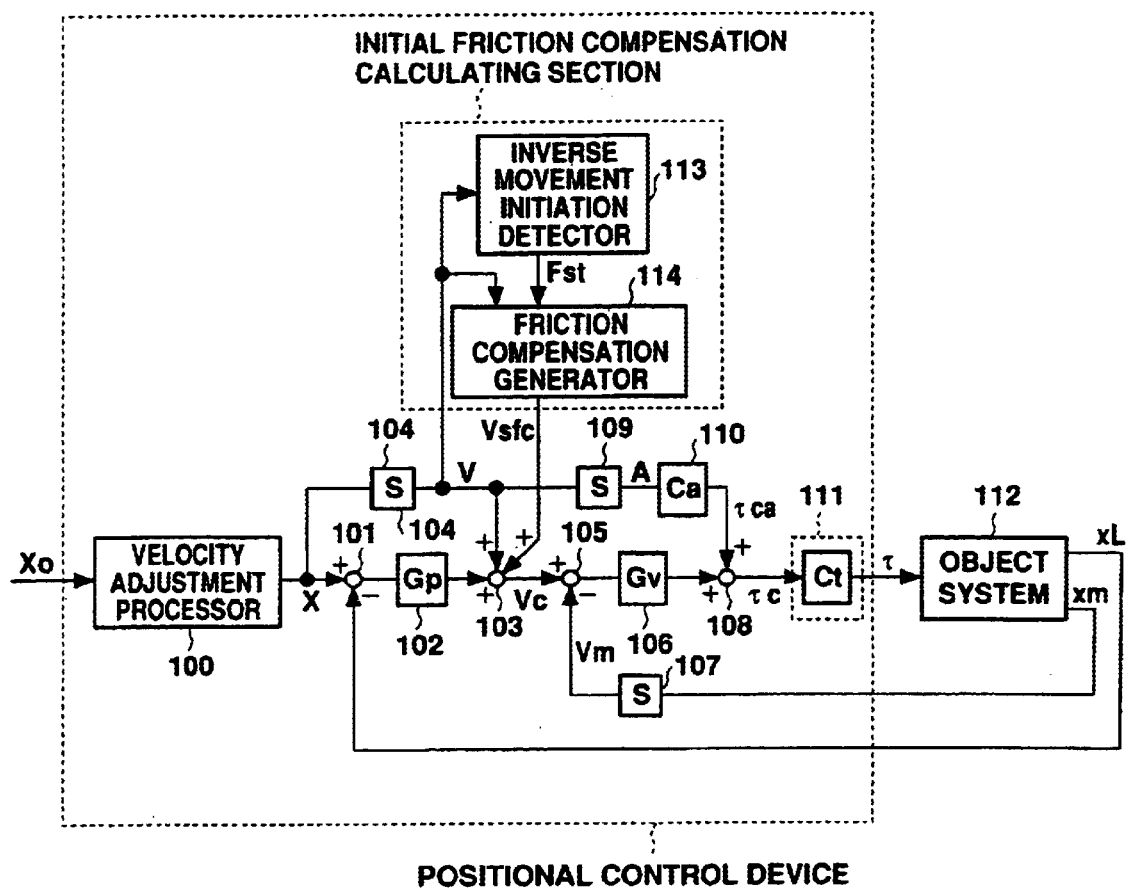
FIG. 5 is a block diagram showing a configuration of a conventional positional control device.
Figure 6:
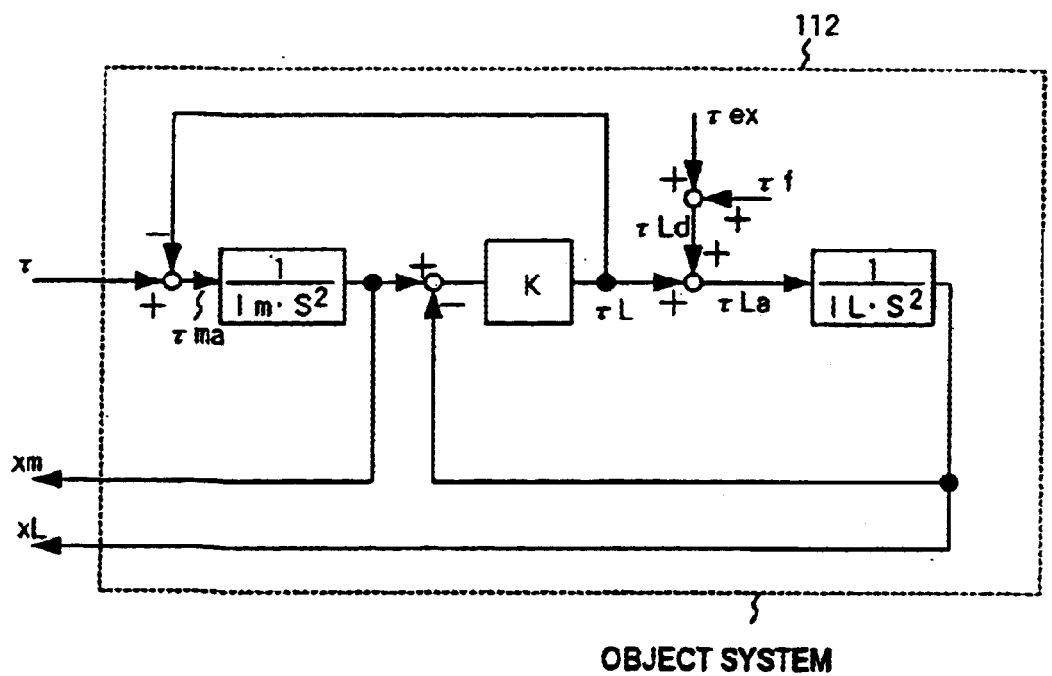
FIG. 6 is a block diagram showing an equivalent representation of a configuration of the object system 112.

FIG. 1 is a block diagram showing a first example configuration of a positional control device according to a preferred embodiment of the present invention. In the positional control device of FIG. 1, components identical to those described above in relation to FIG. 5 are labeled with the same names and reference numerals, and explanation of those components will not be repeated in this section. The initial friction compensation calculating section according to the present invention is described as follows. A movement initiation detector 1 receives input of a velocity command value V, and outputs an initiation detection signal Fst. Fst is a binary signal indicating either ON or OFF, in which ON is output in a form of a pulse according to (8).

$$Fst: ON \text{ (when } V=0 \Rightarrow V>0 \text{ or } V=0 \Rightarrow V<0) \quad (8)$$

A friction compensation torque calculator 2 receives the movement initiation detection signal Fst, and outputs two friction torque compensation values $\tau sfc1$ and $\tau sfc2$ determined by equations (9) and (10) in accordance with the sign of the velocity command value V and a torque command value $\tau c$.

$$\begin{aligned}\tau sfc1 &= -\tau c + \tau sfp \text{ (when } V>0) \\ \tau sfc1 &= -\tau c + \tau sfn \text{ (when } V<0)\end{aligned} \quad (9)$$

$$\begin{aligned}\tau sfc2 &= \tau kfp - \tau sfp \text{ (when } V>0) \\ \tau sfc2 &= \tau kfp - \tau sfn \text{ (when } V<0)\end{aligned} \quad (10)$$

Values of $\tau sfp$, $\tau sfn$, $\tau kfp$, and $\tau kfn$ are preset in the friction compensation torque calculator 2 according to equation (11).

$$\begin{aligned}\tau sfp &= (|\tau sf| - \tau ex)/Ct \\ \tau sfn &= (-|\tau sf| - \tau ex)/Ct \\ \tau kfp &= (|\tau kf| - \tau ex)/Ct \\ \tau kfn &= (-|\tau kf| - \tau ex)/Ct\end{aligned} \quad (11)$$

By adding the friction torque compensation value $\tau sfc1$ to $\tau C$ using equations (9) and (11), equation (12) can be obtained.

$$\begin{aligned}\tau c + \tau sfc1 &= \tau sfp = (|\tau sf| - \tau ex)/Ct \text{ (when } V>0) \\ \tau c + \tau sfc1 &= \tau sfn = (-|\tau sf| - \tau ex)/Ct \text{ (when } V<0)\end{aligned} \quad (12)$$

From equation (12) and equation (4); it can be understood that the friction torque compensation value $\tau sfc1$ is equivalent to the difference between the generated torque during the standstill state and the torque required for initiating a movement. Further, equation (13) can be obtained using equations (10) and (11).

$$\begin{aligned}\tau sfc2 &= (|\tau kf| - |\tau sf|)/Ct \text{ (when } V>0) \\ \tau sfc2 &= -(|\tau kf| - |\tau sf|)/Ct \text{ (when } V<0)\end{aligned} \quad (13)$$

From this equation, it can be understood that the friction torque compensation value $\tau sfc2$ is equivalent to the amount of friction torque change (from static friction to kinetic friction) immediately after initiation of a movement.

A first friction compensation generator 3 receives input of the friction torque compensation value $\tau sfc1$, and outputs, in a pattern, a first initial friction compensation value $Vsfc1$ according to equations (14) and (15).

$$Vsfc1(0) = C \cdot \tau sfc1 \quad (14)$$

$$\begin{aligned}Vsfc1 &= Vsfc1(0) \cdot \exp(-t/Td1) \ (0 \leq t < tc) \\ Vsfc1 &= 0 \ (t \geq tc)\end{aligned} \quad (15)$$

In equation (15), t denotes time passed after the input of $\tau sfc1$, Td1 denotes a time constant, and tc denotes a duration. Td1 and tc are preset in the first friction compensation generator 3. Td1 is set as short as possible while considering the response performance of the velocity loop system. The value of tc is set to approximately several times the value of Td1.

The constant C in equation (14) is a constant preset in the first friction compensation generator 3, which is determined according to equation (16).

$$C = Ct/[K \cdot Td1 \cdot \{1 - \exp(-tc/Td1)\}] \quad (16)$$

By calculating the time integral of the first initial friction compensation value Vsfc1 expressed in equation (15) over the range of 0 to tc, equation (17) can be obtained according to equations (14) and (15).

$$\int_0^{tc} V\!sfc1 \cdot dt = (\tau sfc1 \cdot Ct)/K \qquad (17)$$

This corresponds to the motor deflection amount (xm−xL) required for transmitting the friction torque compensation value τsfc1 to the load side.

A second friction compensation generator 4 receives input of the friction torque compensation value τsfc2, and outputs, in a pattern, a second initial friction compensation value Vsfc2 according to equations (18) and (19).

$$V\!sfc2(0) = C2 \cdot \tau sfc2 \qquad (18)$$

$$\left.\begin{array}{l} V\!sfc2 = 0 \ (0 \le t < tc) \\ V\!sfc2 = V\!sfc2(0) \cdot \exp\{-(t-tc)/Td1\} \ (t \ge tc) \end{array}\right\} \qquad (19)$$

Here, t denotes time elapsed subsequent to the input of τsfc2. It should be noted that, because τsfc1 and τsfc2 are generated simultaneously, t in equations (19) and (15) are on the same time axis. The above-referenced Td1 and tc are also preset in the second friction compensation generator 4.

The constant C2 in equation (18) is a constant preset in the second friction compensation generator 4, which is determined according to equation (20).

$$C2 = Ct/(K \cdot Td1) \qquad (20)$$

Similarly as Vsfc1, by calculating the time integral of the second initial friction compensation value Vsfc2 expressed in equation (19) over the range of 0 to ∞ results in, the motor deflection amount (xm−xL) required for transmitting the friction torque compensation value τsfc2 to the load side is obtained.

An adder 5 adds the first initial friction compensation value Vsfc1 and the second initial friction compensation value Vsfc2 to output the initial friction compensation value Vsfc. An adder 103 subsequently combines Vsfc with the output from the amplifier 102 and the velocity command value V, producing the final velocity command value Vc.

Figure 2:
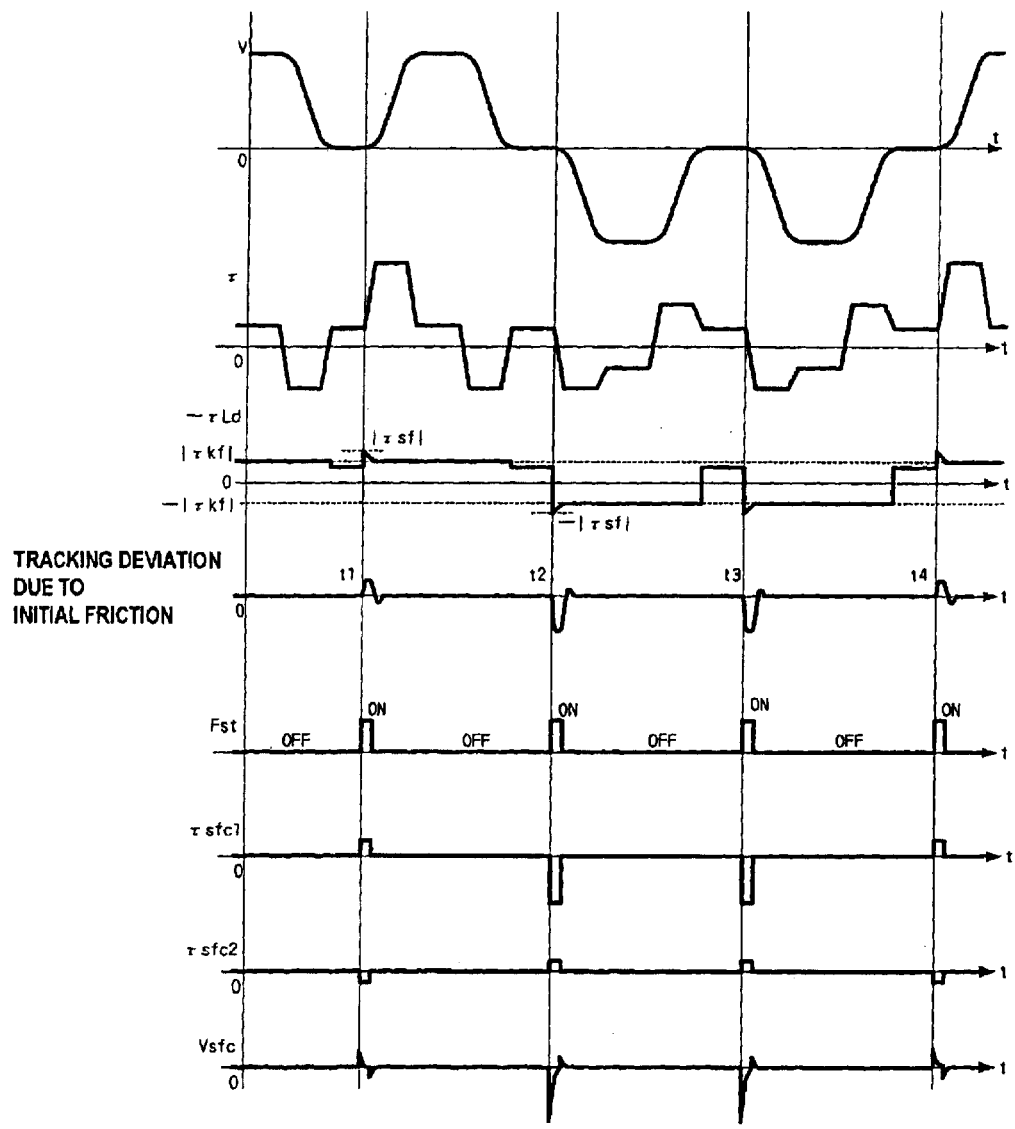
FIG. 2 is a timing chart for explaining an example operation of the positional control device of FIG. 1.
Figure 7:
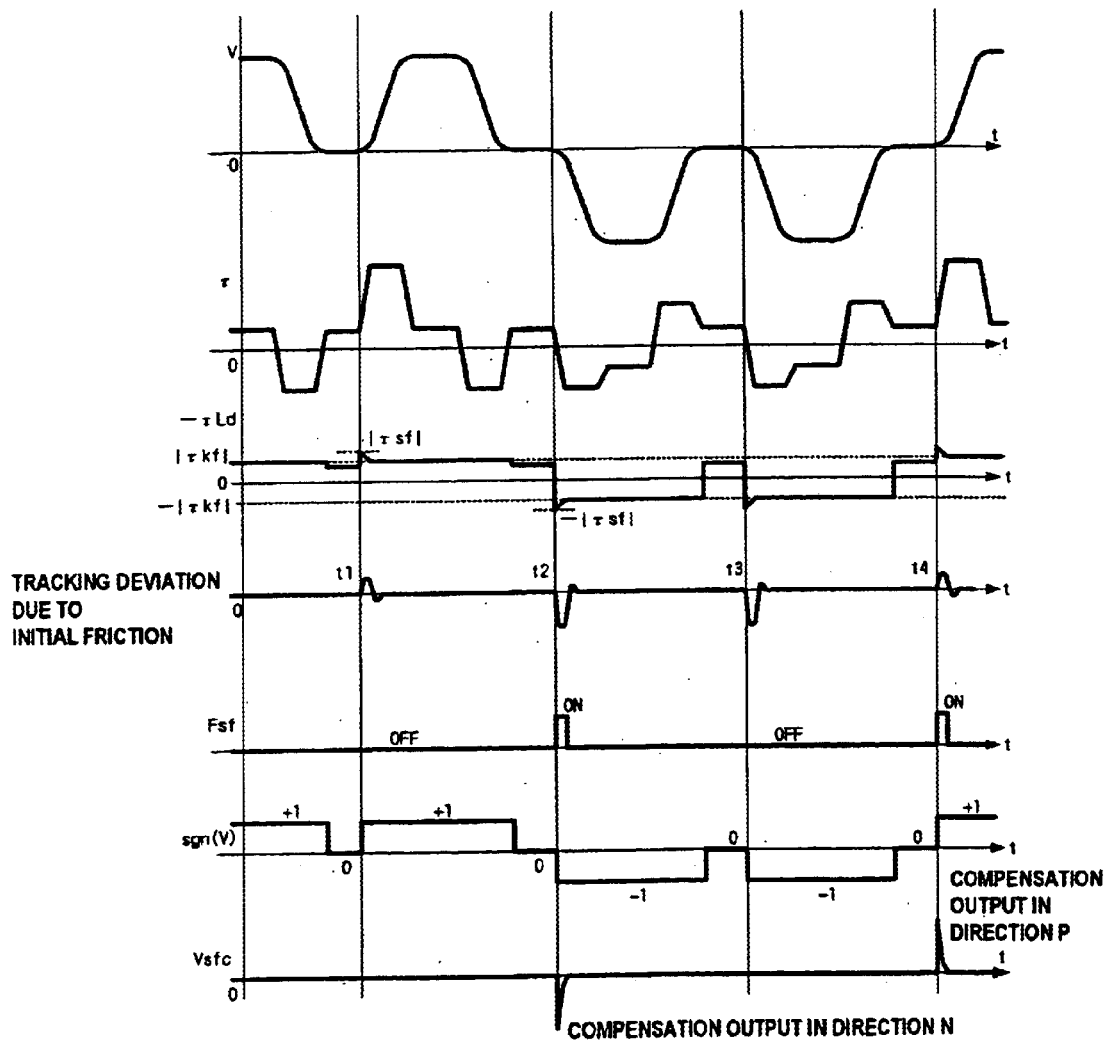
FIG. 7 is a timing chart for explaining an example operation of the positional control device of FIG. 5.

The above-described example operation of the positional control device of FIG. 1 is next explained referring to the timing chart of FIG. 2. In this example, characteristics concerning the object system 112 and the conditions of the positional control device excluding the initial friction compensation calculating section are identical with the previously described conventional example. Accordingly, in the timing chart of FIG. 2, the first to fourth rows from the top describing the operation when no initial friction compensation value is in effect are identical with those rows of FIG. 7. The fifth to eighth rows of FIG. 2 showing the pulse signal Fst, the friction torque compensation values τsfc1 and τsfc2, and the initial friction compensation value Vsfc on the same time axis illustrate the operation of the initial friction compensation calculating section in the positional control device of FIG. 1.

The pulse signal Fst outputs ON at all instances of initiation of movement. As described above, the friction torque compensation values τsfc1 is equivalent to the difference between the generated torque during the standstill state and the torque required for initiating a movement. Further, the friction torque compensation value τsfc2 is equivalent to the amount of friction torque change (from static friction to kinetic friction) immediately after initiation of movement. The initial friction compensation value Vsfc is produced by generating, sequentially on a time axis, the initial friction compensation value Vsfc1 having an integral corresponding to the motor deflection amount required for transmitting the friction torque compensation value τsfc1 to the motor side, and the initial friction compensation value Vsfc2 having an integral corresponding to the motor deflection amount required for transmitting the frictional torque compensation value τsfc2 to the motor side.

In this manner, according to the initial friction compensation function of the positional control device of FIG. 1, an initial friction compensation value having appropriate direction and magnitude is generated at each instance of movement initiation in accordance with the movement direction, the generated torque of the motor at the point of movement initiation, and the amount of friction torque change (from static to kinetic friction) immediately after the movement initiation. Accordingly, tracking delay due to initial friction can be favorably reduced in all instances of movement initiation.

Figures 3A, 3B:
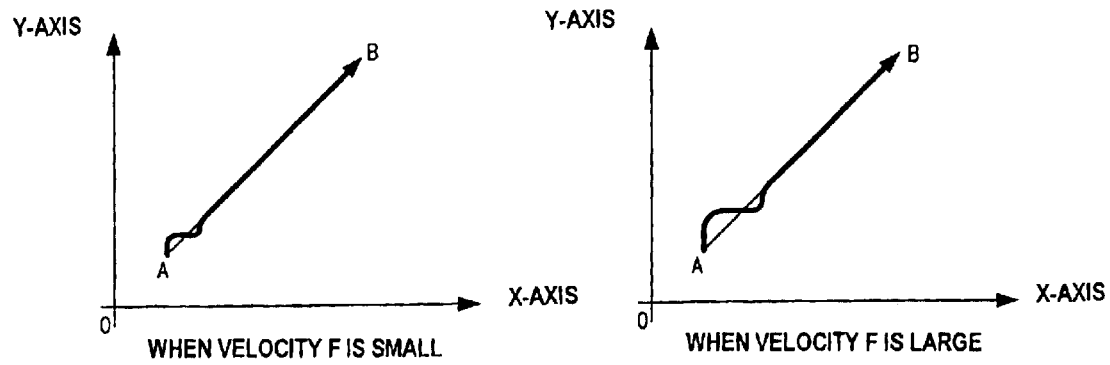
FIGS. 3A and 3B are diagrams for explaining the influence on a positional track caused by a tracking deviation due to initial friction.

Next, the influences of tracking deviation due to initial friction on a positional track when the initial friction compensation according to the present embodiment is not executed will be described. In this example, it is assumed that a movable table is configured such that its free movement in an X-Y coordinate system is enabled by a positional control device controlling position in the X-axis direction and a positional control device controlling position in the Y-axis direction. FIGS. 3A and 3B show a positional track generated when the movable table is moved in the coordinate system from point A to point B at velocity F. With respect to the Y-axis, it is assumed that both static and kinetic frictions are small and that almost no tracking deviation occurs due to initial friction. With respect to the X-axis, tracking deviation due to initial static friction is generated such that a deviation first occurs in direction P along the Y-axis due to a change in friction torque immediately after the movement initiation, which subsequently causes a positional track error in direction N along the Y-axis. The positional track error tends to become larger when velocity F is larger (FIG. 3B).

Figure 4:
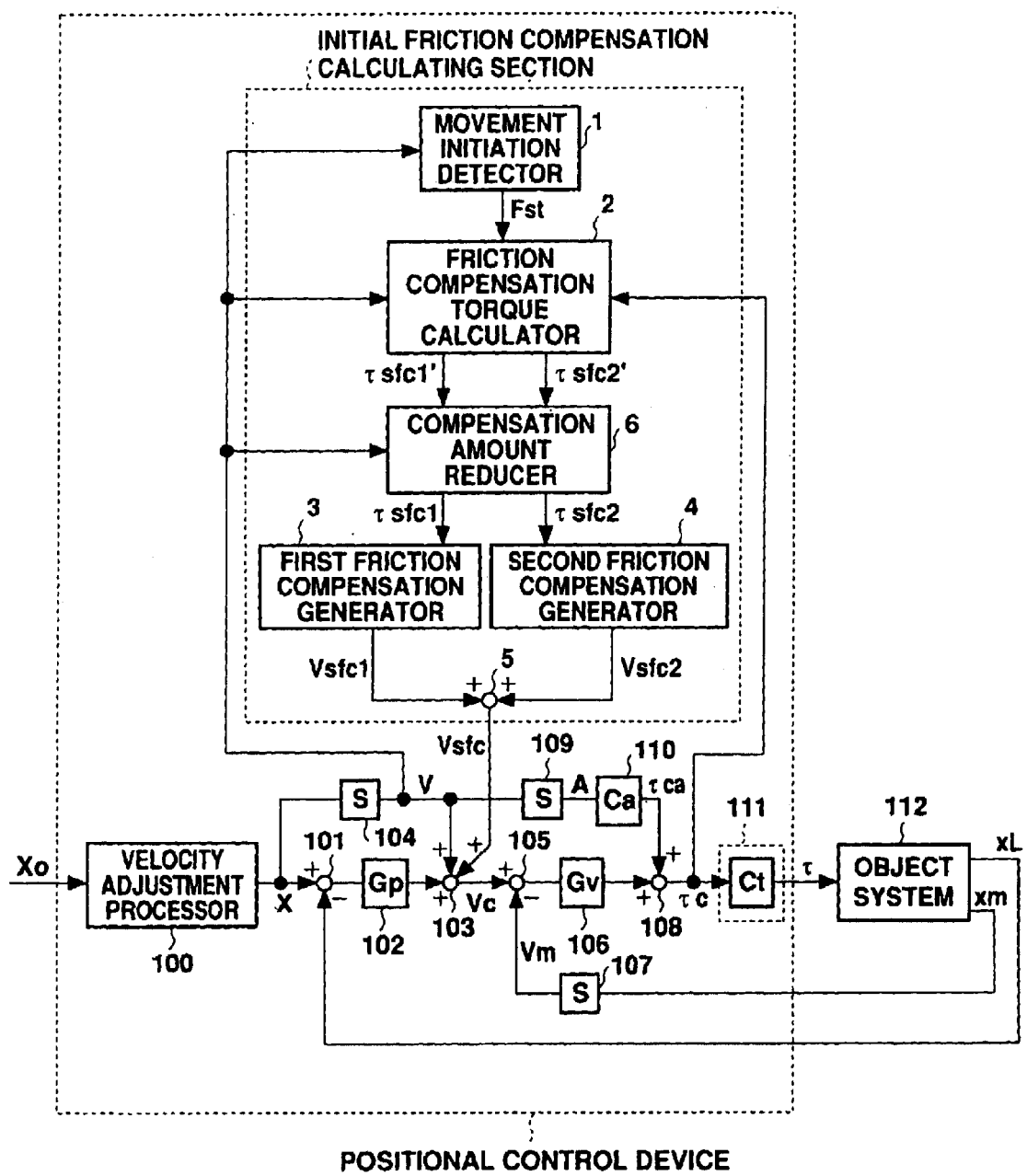
FIG. 4 is a block diagram showing another configuration of a positional control device according to the embodiment of the present invention.

FIG. 4 is a block diagram showing a second example configuration of a positional control device according to the present invention. Before explaining this configuration, operation of the velocity adjustment processor 100 will first be described. The velocity adjustment processor typically executes a high-order function type velocity adjustment by allowing serial operation of a plurality of blocks for linearly accelerating/decelerating the velocity command value Vo which is a time derivative of the positional command value Xo. Operation of the velocity adjustment processor 100 is explained below using a quadratic function type velocity adjustment as an example. The velocity adjustment time of a first linear velocity adjustment block is denoted by T1, and the velocity adjustment time of a second linear velocity adjustment block is denoted by T2 (where T1>T2). While at the initial position Xo=0, when a superordinate device generates a positional operation command having velocity Vo and moving distance D, the positional command value Xo is represented by the following equation (21).

$$\left.\begin{array}{l} Xo = 0 \ (t < 0, \ t > D/Vo) \\ Xo = Vo \cdot t \ (0 \le t \le D/Vo) \end{array}\right\} \qquad (21)$$

In this case, an input supplied to the first linear velocity adjustment block is expressed by dXo/dt, while output V1 therefrom is expressed as follows.

$$V1 = (1/T1)\int_0^{T1} Vo\,dt = (Vo/T1)\cdot t \brace (0 \le t \le T1)} \quad (22)$$

V1 is input in the second linear velocity adjustment block, and output V2 therefrom is expressed as follows.

$$V2 = (1/T2)\int_0^{T2} V1\,dt = \{Vo/(2\cdot T1\cdot T2)\}\cdot t^2 \brace (0 \le t \le T2)} \quad (23)$$

Accordingly, the positional command value X, which is the output from the velocity adjustment processor 100 during a movement initiation (0≦t≦T2), is obtained as according to equation (24) by differentiating equation (23) over the range of 0 to t.

$$X = \{Vo/(6\cdot T1\cdot T2)\}\cdot t^3 \, (0 \le t \le T2) \quad (24)$$

It is to be noted that, in this case, the velocity command value V output from the differentiator 104 during a movement initiation is equivalent to this V2.

According to the above, jerk (change in acceleration; referred to hereinafter as B) during a movement initiation when a quadratic function type velocity adjustment is performed can be expressed according to equation (25) by finding the second time derivative of V2(=V) given by equation (23).

$$B = Vo/(T1\cdot T2) \quad (25)$$

It can be understood that, during initiation of a movement, jerk B is a fixed value proportional to the velocity command value Vo. The above-described calculation is employed when performing a quadratic function type velocity adjustment. When performing a velocity adjustment according to a function of nth order, a fixed value proportional to the velocity command value Vo can be similarly obtained by differentiating to the nth order the velocity command value V.

Next described is a case when the superordinate device generates a positional operation command for a micro displacement ΔD. A positional command value Xo input by the superordinate device in the positional control device is actually generated in units of time ΔT. For this reason, when ΔD is a micro distance, the velocity command value Vo for cannot exceed ΔD/ΔT. In other words, the velocity command value Vo becomes very small when making a micro movement. When an initial friction compensation is executed while making such a micro movement, a slight friction torque change over time would easily cause an excessive movement.

Summarizing the above and referring to FIGS. 3A and 3B, when the velocity command value Vo is small (Vo is small when F is small), positional track deviation due to initial friction naturally tends to occur at a low level. When making a micro movement, because the velocity command value Vo is relatively very small and execution of an initial friction compensation tends to cause excessive movement, it should be apparent that there exists an advantage in adjusting the amount of compensating effect of the initial friction compensation in accordance with the velocity command value Vo.

The block diagram of FIG. 4 showing a second configuration example of a positional control device according to the present invention will now be described. In the positional control device of FIG. 4, components identical to those described above in relation to FIG. 1 are labeled with the same names and reference numerals, and explanation of those components will not be repeated in this section. In light of the above-noted advantage of reducing the compensating effect of the initial friction compensation in accordance with the velocity command value Vo, a compensation amount reducer 6 functions to reduce the friction torque compensation value when the velocity command value Vo is relatively small. When the velocity adjustment processor 100 executes a velocity adjustment according to a function of nth order, a fixed value proportional to the velocity command value Vo can be obtained by differentiating the initial velocity command value V to the nth order, as shown in equation (25).

The operation of the compensation amount reducer 6 when the velocity adjustment processor 100 executes a quadratic function type velocity adjustment is as follows. The compensation amount reducer 6 receives input of τsfc1' and τsfc2' which are the outputs from the friction compensation torque calculator 2 given by equations (9) and (10). Here the prime symbols "'" are added only for the convenience of explanation, and the input values do not differ from the above-described τsfc1 and τsfc2. During initiation of a movement, the compensation amount reducer 6 takes the second time derivative of V to calculate jerk B expressed by equation (25). With respect to the absolute value of jerk B (|B|), a reduction ratio α can be determined according to the following equation, for example.

$$\alpha = |B|/|B| \; (0 \le |B| \le |B0|) \brace \alpha = 1 \; (|B| > |B0|)} \quad (26)$$

Here, |B0| is an absolute jerk value that determines the starting point of reduction, which is preset in the compensation amount reducer 6.

In turn, equation (27) determines the friction torque compensation values τsfc1 and τsfc2 output from the compensation amount reducer 6.

$$\tau sfc1 = \alpha \cdot \tau sfc1' \brace \tau sfc2 = \alpha \cdot \tau sfc2'} \quad (27)$$

The value of order n in a function type velocity adjustment required for the above operation of compensation amount reducer 6 is also preset in the compensation amount reducer 6. The operations of the first friction compensation generator 3 and the second friction compensation generator 4 upon receiving input of the friction torque compensation values τsfc1 and τsfc2, respectively, are identical with those of FIG. 1. It should be noted that determination of the reduction ratio α of the compensation amount reducer 6 is not limited by equation (26). Because |B| is in a proportional relationship with the absolute value of Vo (|Vo|), the characteristic in which the friction compensation value is reduced as the velocity command value Vo becomes smaller can be realized as long as a negative correlation exists between |B| and α.

As described above, at each instance of initiation of movement, the system configured according to the embodiment generates an initial friction compensation value having appropriate direction and magnitude in accordance with the direction of the initiated movement, the generated torque of the motor at the point of initiation, and the amount of friction torque change (from static friction to kinetic friction) immediately after initiation. Accordingly, tracking deviation due to initial friction can be favorably minimized in all instances of initiation of movement.

What is claimed is:

1. A positional control device for controlling a position of a controlled object by generating a command for a drive motor of a controlled object system in accordance with a positional command value supplied from a superordinate device, comprising:

means for calculating, using the positional command value, a velocity command value which serves as a command concerning velocity of the controlled object; and means for calculating, using the positional command value and the velocity command value, a torque command value which serves as a command concerning torque generated by the drive device; wherein the means for calculating the torque command value includes means for calculating a torque compensation amount concerning friction occurring when the controlled object initiates a movement, the means for calculating the torque compensation amount being used when calculating the torque command value; and the means for calculating the torque compensation amount calculates, based on the velocity command value and the torque command value, a torque compensation amount corresponding to a difference between torque being generated during a standstill state and torque required by the controlled object to initiate the movement.

2. A positional control device as defined in claim 1, wherein the torque compensation amount is a fixed value determined according to the sign of the velocity command value.

3. A positional control device as defined in claim 1, wherein the torque compensation amount is a value varied corresponding to a change in the velocity command value.

4. A positional control device for controlling a position of a controlled object by generating a command for a drive motor of a controlled object system in accordance with a positional command value supplied from a superordinate device, comprising:

means for calculating, using the positional command value, a velocity command value which serves as a command concerning velocity of the controlled object; and means for calculating, using the positional command value and the velocity command value, a torque command value which serves as a command concerning torque generated by the drive device; wherein the means for calculating the torque command value includes means for calculating a torque compensation amount concerning friction that occurs when the controlled object initiates a movement, the means for calculating the torque compensation amount being used when calculating the torque command value; and the means for calculating the torque compensation amount calculates, based on the velocity command value and the torque command value, a torque compensation amount corresponding to an amount of change in friction that occurs during a transition from static friction to kinetic friction in a period immediately before and after initiation of the movement.

5. A positional control device as defined in claim 4, wherein the torque compensation amount is a fixed value determined according to the sign of the velocity command value.

6. A positional control device as defined in claim 4, wherein the torque compensation amount is a value corresponding to a change in the velocity command value.

7. A positional control device for controlling a position of a controlled object by generating a command for a drive motor of a controlled object system in accordance with a positional command value supplied from a superordinate device, comprising:

means for calculating, using the positional command value, a velocity command value which serves as a command concerning velocity of the controlled object; and means for calculating, using the positional command value and the velocity command value, a torque command value which serves as a command concerning torque generated by the drive device; wherein the means for calculating the torque command value includes means for calculating a torque compensation amount concerning friction that occurs when the controlled object initiates a movement, the means for calculating the torque compensation amount being used when calculating the torque command value; and the means for calculating the torque compensation amount calculates, based on the velocity command value and the torque command value, a first torque compensation amount corresponding to a difference between torque being generated during a standstill state and torque required by the controlled object to initiate the movement, and a second torque compensation amount corresponding to an amount of change in friction that occurs during a transition from static friction to kinetic friction in a period immediately before and after initiation of the movement.

8. A positional control device as defined in claim 7, wherein the torque compensation amount is a fixed value determined according to the sign of the velocity command value.

9. A positional control device as defined in claim 7, wherein the torque compensation amount is a value varied corresponding to a change in the velocity command value.

10. A positional control method for controlling a position of a controlled object by generating a command for a drive motor of a controlled object system in accordance with a positional command value supplied from a superordinate device, comprising:

calculating, using the positional command value, a velocity command value which serves as a command concerning velocity of the controlled object; and calculating, using the positional command value and the velocity command value, a torque command value which serves as a command concerning torque generated by the drive device; wherein the calculation of the torque command value includes calculating a torque compensation amount concerning friction that occurs when the controlled object initiates a movement; and the calculation of the torque compensation amount includes calculating, based on the velocity command value and the torque command value, a torque compensation amount corresponding to a difference between torque being generated during a standstill state and torque required by the controlled object to initiate the movement.

11. A positional control method as defined in claim 10, wherein the torque compensation amount is a fixed value determined according to the sign of the velocity command value.

12. A positional control method as defined in claim 10, wherein the torque compensation amount is a value varied corresponding to a change in the velocity command value.

13. A positional control method for controlling a position of a controlled object by generating a command for a drive motor of a controlled object system in accordance with a positional command value supplied from a superordinate device, comprising:

calculating, using the positional command value, a velocity command value which serves as a command concerning velocity of the controlled object; and calculating, using the positional command value and the velocity command value, a torque command value which serves as a command concerning torque generated by the drive device; wherein the calculation of the torque command value includes calculating a torque compensation amount concerning friction that occurs when the controlled object initiates a movement; and the calculation of the torque compensation amount includes calculating, based on the velocity command value and the torque command value, a torque compensation amount corresponding to an amount of change in friction that occurs during a transition from static friction to kinetic friction in a period immediately before and after initiation of the movement.

14. A positional control method as defined in claim 13, wherein the torque compensation amount is a fixed value determined according to the sign of the velocity command value.

15. A positional control method as defined in claim 13, wherein the torque compensation amount is a value varied corresponding to a change in the velocity command value.

16. A positional control method for controlling a position of a controlled object by generating a command for a drive motor of a controlled object system in accordance with a positional command value supplied from a superordinate device, comprising:

calculating, using the positional command value, a velocity command value which serves as a command concerning velocity of the controlled object; and calculating, using the positional command value and the velocity command value, a torque command value which serves as a command concerning torque generated by the drive device; wherein the calculation of the torque command value includes calculating a torque compensation amount concerning friction that occurs when the controlled object initiates a movement; and the calculation of the torque compensation amount includes calculating, based on the velocity command value and the torque command value, a first torque compensation amount corresponding to a difference between torque being generated during a standstill state and torque required by the controlled object to initiate the movement, and a second torque compensation amount corresponding to an amount of change in friction that occurs during a transition from static friction to kinetic friction in a period immediately before and after initiation of the movement.

17. A positional control method as defined in claim 16, wherein the torque compensation amount is a fixed value determined according to the sign of the velocity command value.

18. A positional control method as defined in claim 16, wherein the torque compensation amount is a value varied corresponding to a change in the velocity command value.

* * * * *